United States Patent [19]

Petrone

[11] Patent Number: 5,503,188
[45] Date of Patent: Apr. 2, 1996

[54] INFLATABLE AIR BAG PIPELINE STOPPER

[76] Inventor: Joseph A. Petrone, 95 James Dr., Ringwood, N.J. 07456

[21] Appl. No.: 380,210

[22] Filed: Jan. 30, 1995

Related U.S. Application Data

[63] Continuation of Ser. No. 176,043, Dec. 30, 1993, abandoned.

[51] Int. Cl.$^6$ .................................................. F16L 55/10
[52] U.S. Cl. ............................................ 138/93; 138/121
[58] Field of Search .................................. 138/89, 90, 93, 138/128, 170, 171, 121, 122, 177, 178

[56] References Cited

U.S. PATENT DOCUMENTS

| | | | |
|---|---|---|---|
| 5,930 | 6/1874 | Street | 138/128 |
| 28,432 | 5/1860 | Alden | 138/128 |
| 31,614 | 3/1861 | Mayall | 138/128 |
| 148,428 | 3/1874 | Dodge | 138/128 |
| 154,725 | 9/1874 | Street | 138/128 |
| 160,526 | 3/1875 | Joslin | 138/128 |
| 628,726 | 7/1899 | Schultz | 138/93 |
| 740,795 | 10/1903 | Behringer | 138/93 |
| 1,048,208 | 12/1912 | Raflovich | 138/93 |
| 1,760,750 | 5/1930 | Goodman | 138/93 |
| 1,863,624 | 6/1932 | Evans | 138/128 |
| 2,358,743 | 9/1944 | Smith | 138/128 |
| 2,424,315 | 7/1947 | Hyatt et al. | 138/128 |
| 2,595,408 | 5/1952 | Quest | 138/128 |
| 2,843,154 | 7/1958 | Hosking | 138/93 |
| 3,834,422 | 9/1974 | Larson | 138/93 |
| 3,842,866 | 10/1974 | Miller | 138/171 |
| 3,996,968 | 12/1976 | Bergman et al. | 138/128 |
| 4,079,755 | 3/1978 | Van der Lans | 138/93 |
| 4,446,181 | 5/1984 | Wood | 138/128 |
| 4,478,661 | 10/1984 | Lewis | 138/128 |
| 4,550,751 | 11/1985 | Shimamura | 138/93 |
| 4,565,222 | 1/1986 | Lundman | 138/93 |
| 4,614,206 | 9/1986 | Mathison et al. | 138/93 |
| 4,660,644 | 4/1987 | Egnor | 138/93 |
| 4,964,439 | 10/1990 | Vanderlans | 138/93 |
| 5,076,328 | 12/1991 | Lyon | 138/93 |
| 5,163,481 | 11/1992 | Catallo | 138/128 |
| 5,234,034 | 8/1993 | Lyon | 138/93 |

FOREIGN PATENT DOCUMENTS

| | | | |
|---|---|---|---|
| 203613 | 10/1983 | Germany | 138/93 |
| 20301 | of 1907 | United Kingdom | 138/93 |
| 188695 | 11/1922 | United Kingdom | 138/93 |
| 545198 | 5/1942 | United Kingdom | 138/128 |
| 1245254 | 9/1971 | United Kingdom | 138/93 |

Primary Examiner—James E. Bryant, III
Attorney, Agent, or Firm—Friscia & Nussbaum

[57] ABSTRACT

A pipeline flow stopper is insertable in a collapsed, deflated form in a pipeline through a tap hole and then inflated to temporarily block fluid or gas flow through the pipeline. The stopper comprises an inner inflatable bladder encased within an outer bladder casing. The inflatable bladder receives a pressurized gas and inflates to an inflated form within the pipeline. The bladder casing is constructed of fabric coated with a flexible polymer to render the fabric impervious to the fluid or gas in the pipeline. The fabric is joined together along seams either by stitching which is thereafter sealed by liquid seam sealer, cementing, vulcanization or the like, or the stitching can be eliminated entirely and all the seams electronically heat sealed to join them and prevent fluid or gas from escaping past the stopper through the seams. The bladder casing encloses the inflatable bladder and sealingly engages with the inner wall surface of the pipeline when the inflatable bladder is inflated to seal off the pipeline. In order to assist in preventing leakage of fluid or gas past the outside of the inflated pipe flow stopper and the inside of the pipeline wall, a flexible sealing member, such as an O-ring made of soft rubber or plastic, is placed circumferentially around the outside diameter of the bladder casing for sealingly engaging with the pipeline wall.

12 Claims, 8 Drawing Sheets

INFLATABLE AIR BAG PIPELINE STOPPER

This is a continuation of application Ser. No. 08/176,043 filed on Dec. 30, 1993, now abandoned.

BACKGROUND OF THE INVENTION

The present invention pertains generally to a pipeline flow stopper. In particular, the present invention pertains to a fully collapsible, inflatable bag-type stopper constructed of an inner airtight bladder encased within an outer fabric casing having sealed seams.

Conventionally, a collapsible, inflatable pipeline flow stopper is constructed of an inner airtight bladder encased within an outer sewn fabric casing. The pipeline flow stopper may be inserted into a pipeline through a small opening tapped in the pipe, commonly known as a tap hole. The pipeline flow stopper may be inserted into the pipeline either by manually pushing it into the tap hole or by using various mechanical devices that facilitate the insertion of the pipeline flow stopper through the tap hole. The purpose of the pipeline flow stopper is to form a temporary obstruction or closure in the pipeline to stop the flow of its contents so that the pipeline can be repaired, replaced, tested or altered in some way.

Figure 3A:
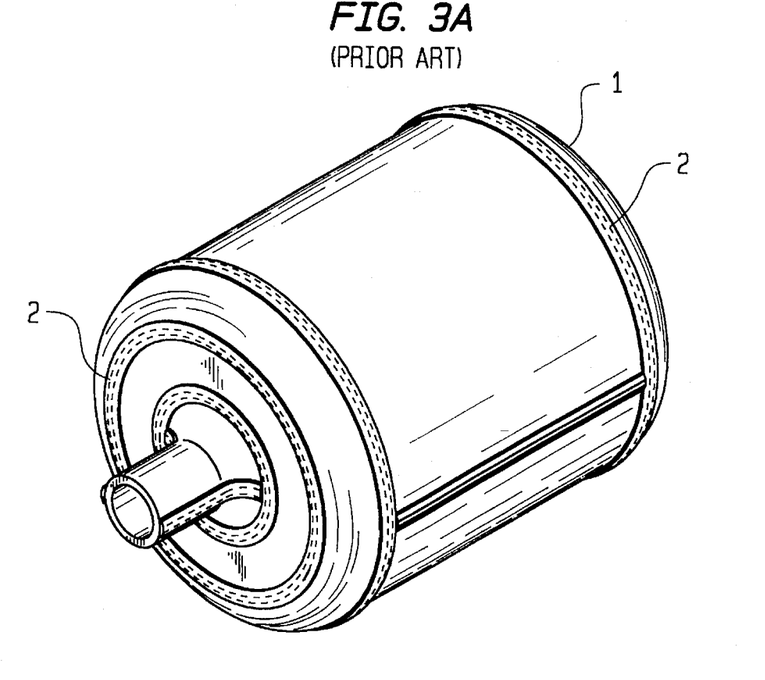
FIG. 3(a) is a front perspective view of a prior art bladder casing for a pipeline flow stopper.
Figure 3B:
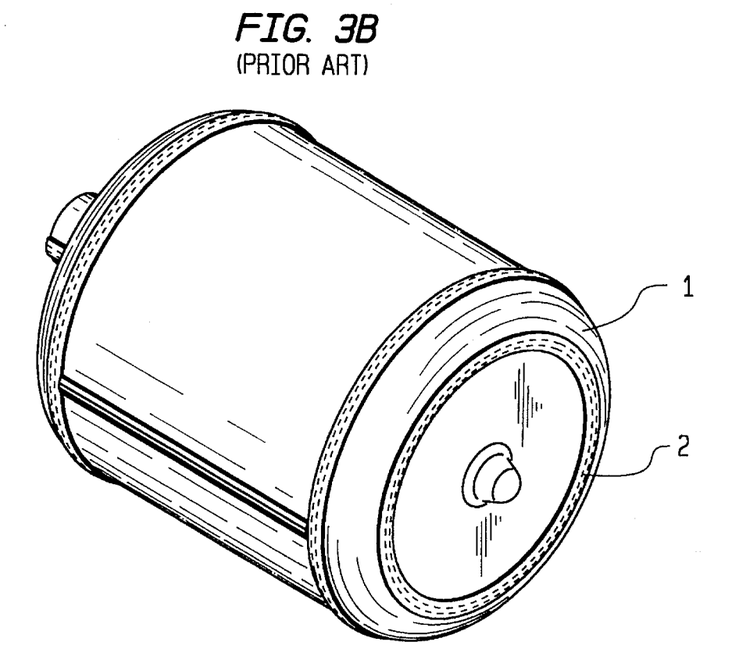
FIG. 3(b) is a rear perspective view of the prior art bladder casing shown in FIG. 3(a)
Figure 4A:
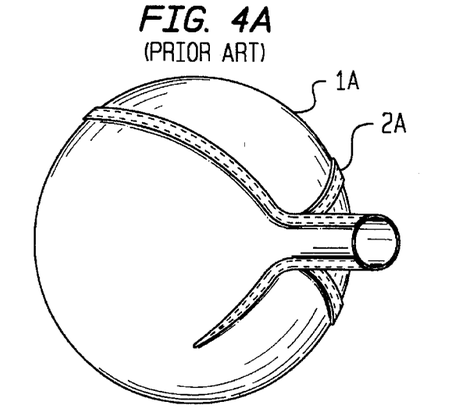
FIG. 4(a) is a front perspective view of another prior art bladder casing for a pipeline flow stopper.
Figure 4B:
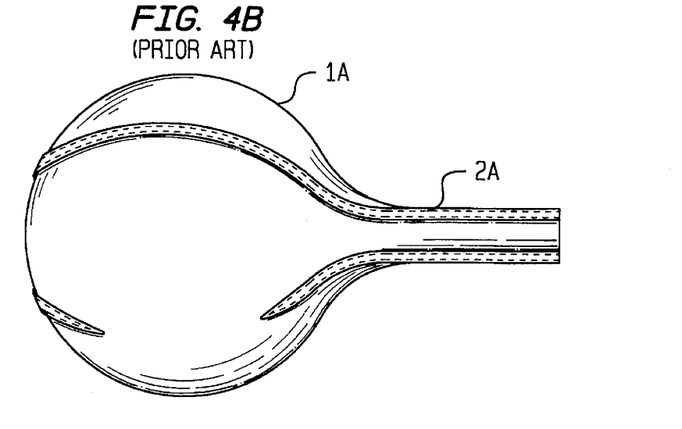
FIG. 4(b) is a side view of the prior art bladder casing shown in FIG. 4(a)
Figure 4C:
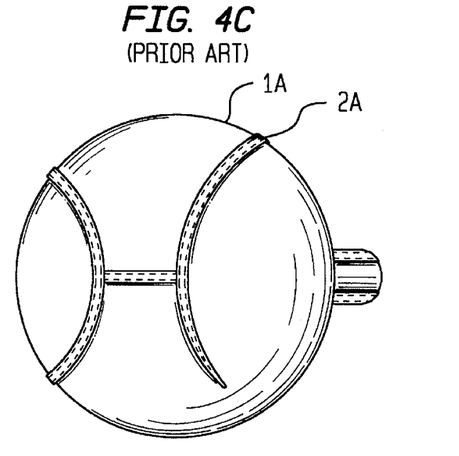
FIG. 4(c) is a rear perspective view of the prior art bladder casing shown in FIG. 4(a)
Figure 5:
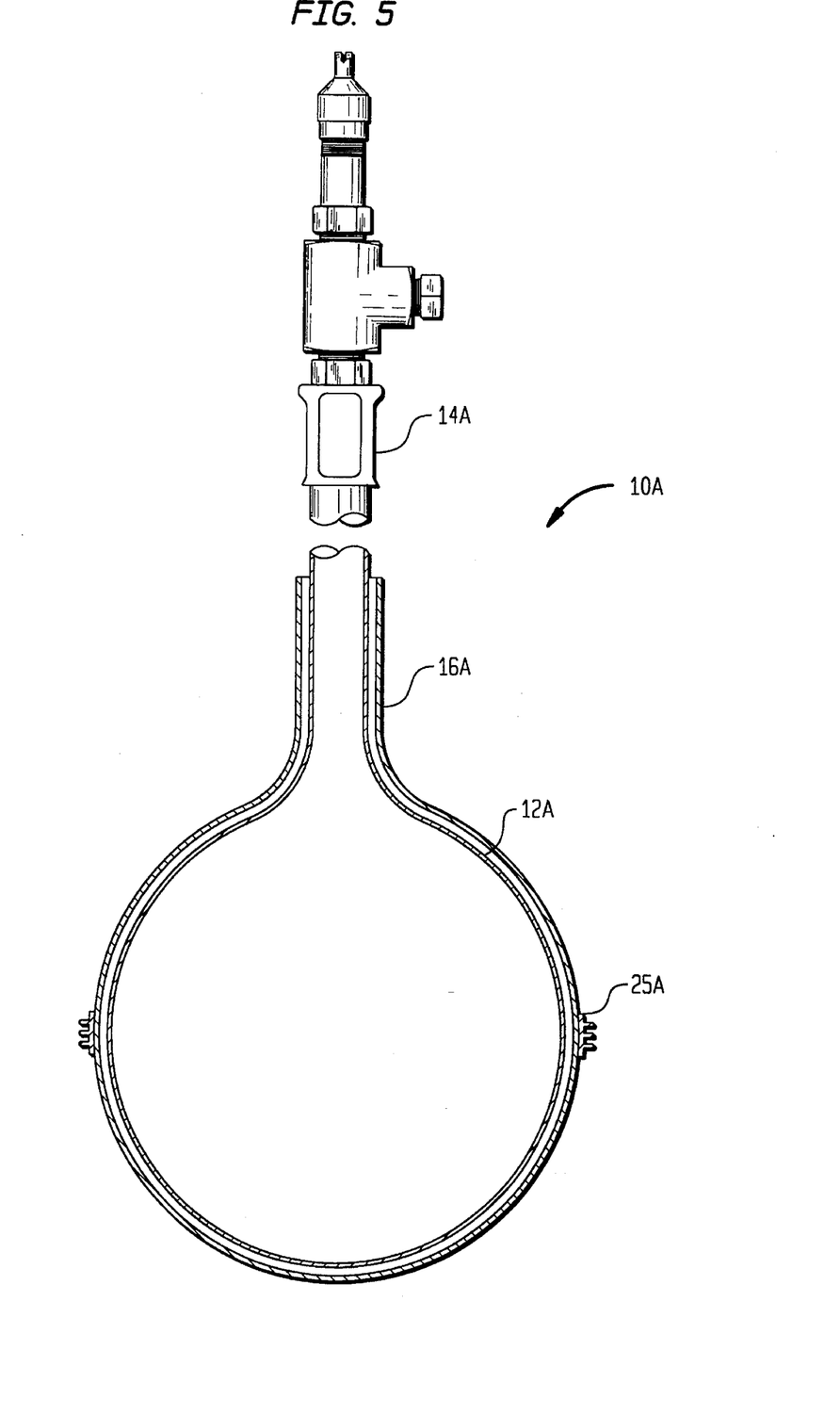
FIG. 5 is a partial sectional view of one embodiment of a pipeline flow stopper according to the present invention.

FIGS. 3 and 4 show two conventional bag-type pipeline flow stoppers comprised of an outer sewn fabric bladder casing having sewn seams. The pipeline flow stopper shown in FIGS. 3(a)–3(b) has a bladder casing 1 constructed from a coated fabric which is cut into the desired shape and stitched together along sewn seams 2. The pipeline flow stopper shown in FIGS. 4(a)–4(c) has a bladder casing 1a constructed of uncoated fabric which is likewise sewn together along sewn seams 2a. For illustrative purposes, one stopper has a cylindrical shape and the other has a spherical shape, each of which is effective to sealingly engage with the inner peripheral surface of a section of pipeline.

While the prior art pipeline flow stoppers are generally effective to block the major flow of the pipeline contents, they permit, due to their construction, some leakage past the stoppers. The sewn seams 2 and 2a of both types of conventional bladder casings 1 and 1a are disadvantageous because some of the contents, for example, pressurized gas, within the pipeline is able to escape past the sewn seams and the inner bladder. Also, in the case of an uncoated fabric, gas escapes by capillary action through the exposed fibers of the fabric, a phenomenon known as wicking. Furthermore, there is also some leakage between the outside of the stopper, i.e., the outside of the fabric bladder casing and the inside of the pipe wall. Thus, the conventional art has the disadvantage of not providing a fully collapsible pipeline flow stopper that can be inserted into a pipeline through a tap hole and which is leak-proof and which can prevent the flow of any gas past the stopper.

Therefore, there is a need to provide a fully collapsible pipeline flow stopper which can be inserted into a pipeline through a tap hole and which has a bladder casing having a leak-proof construction to prevent any gas from escaping past the stopper.

SUMMARY OF THE INVENTION

The present invention is intended to overcome the drawbacks of the conventional art.

It is an object of the present invention to provide a fully collapsible, inflatable pipeline flow stopper capable of being inserted into a pipeline through a tap hole and having a bladder casing that has a leak-proof construction effective to prevent gas from escaping past the stopper.

Another object of the present invention is to provide a fully collapsible, inflatable pipeline flow stopper capable of being inserted into a pipeline through a tap hole and which is easy to manufacture yet rugged and durable in construction.

Another object of the present invention is to provide a fully collapsible pipeline flow stopper having a soft, flexible sealing member, such as an O-ring made of rubber or plastic, disposed circumferentially around the outside of the bladder casing in order to effect an airtight seal between the inside of the pipe and the outside of the pipeline flow stopper.

In accordance with the present invention, a fully collapsible pipeline flow stopper capable of being inserted into a pipeline through a tap hole comprises an inner inflatable bladder encased within an outer fabric bladder casing. The bladder casing is constructed of a fabric coated with a suitable polymer, such as vinyl, polyurethane, natural rubber, neoprene, butyl or the like, to fluidtightly seal the pores of the fabric to prevent gas from escaping past the stopper through the fabric. The fabric may be sewn together along seams and the seams sealed by a liquid seam sealer, cementing, vulcanization or some other method, or the sewing may be entirely eliminated and the seams sealed by electronic heat sealing or the like, to prevent gas from escaping past the stopper through the seams.

In accordance with the present invention, the bladder casing encloses the inflatable bladder, and the stopper is effective, when the inflatable bladder is inflated, to seal off an upstream section of pipeline from a downstream section. The bladder casing has a leak-proof construction, and a soft, flexible sealing member, such as an O-ring made of rubber or plastic, extends circumferentially around the outside of the bladder casing and forms an airtight seal with the inner wall of the pipe to assist in preventing gas from the upstream section of pipeline from escaping past the stopper and entering the downstream section.

Thus, in accordance with the present invention, a pipeline flow stopper is provided which effectively prevents any gas from escaping therepast, either through the fabric of the bladder casing or through the seams of the bladder casing, or between the outside of the bladder casing and the inside of the pipe.

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated embodiments, and such further applications of the principles of the invention as disclosed herein, as would normally occur to one skilled in the art to which the invention pertains.

Figure 1A:
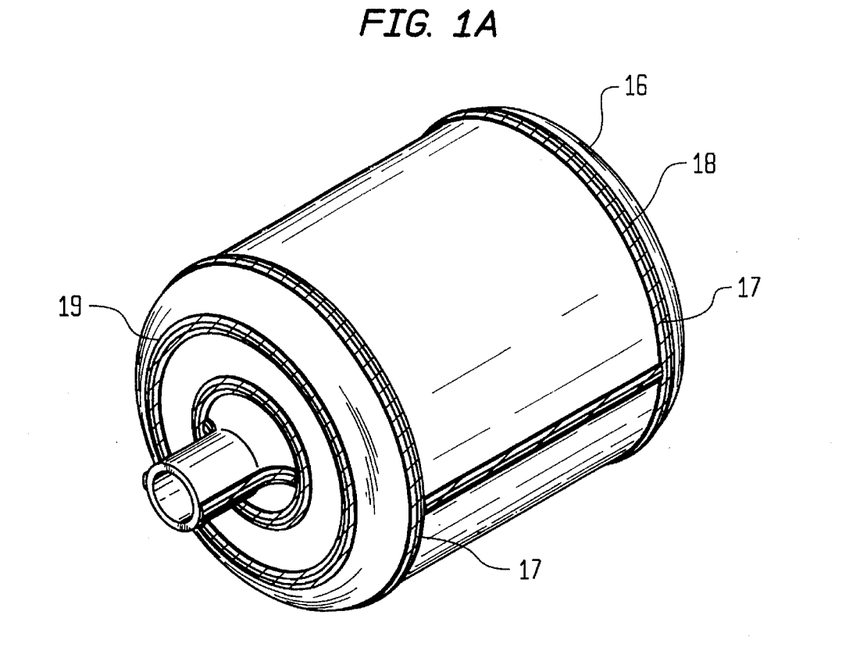
FIG. 1(a) is a front perspective view of a bladder casing for a pipeline flow stopper in accordance with one embodiment of the present invention.
Figure 1B:
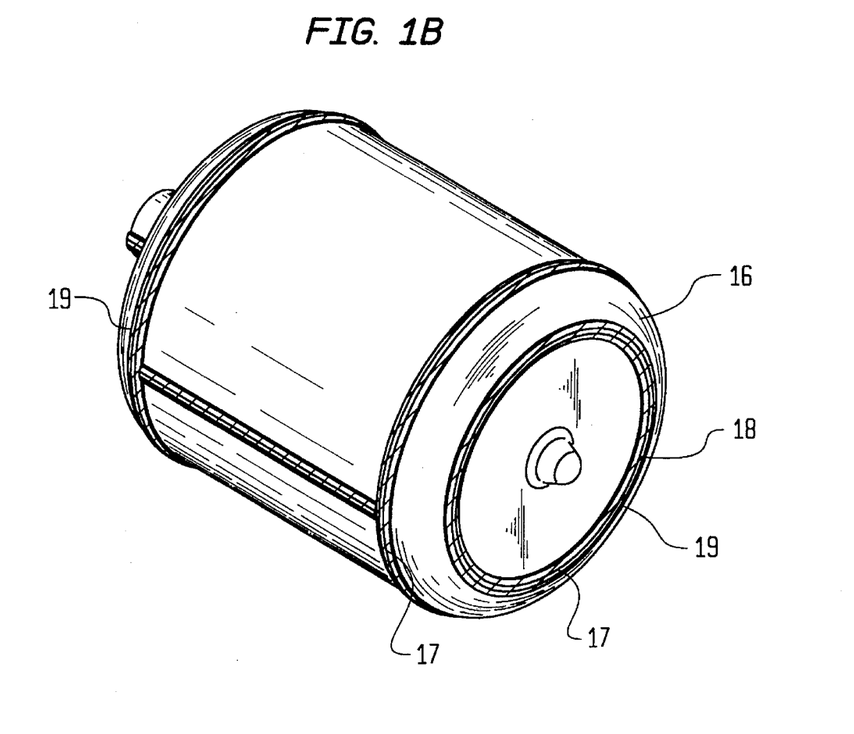
FIG. 1(b) is a rear perspective view of the bladder casing shown in FIG. 1(a)
Figure 2A:
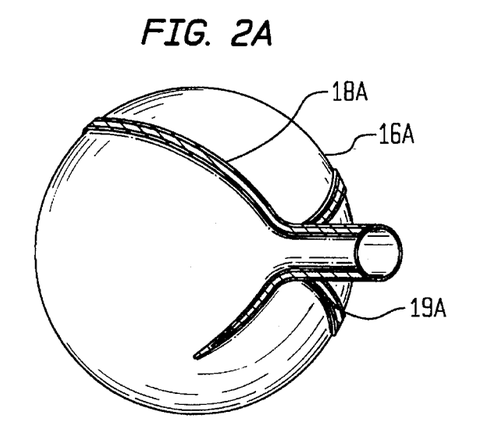
FIG. 2(a) is a front perspective view of another embodiment of a bladder casing for a pipeline flow stopper in accordance with the present invention.
Figure 2B:
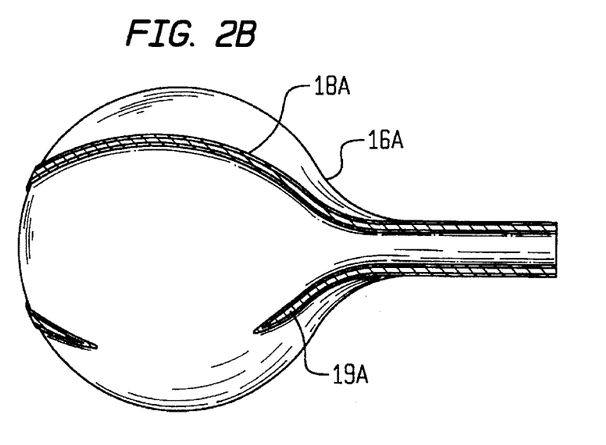
FIG. 2(b) is a side perspective view of the bladder casing shown in FIG. 2(a)
Figure 2C:
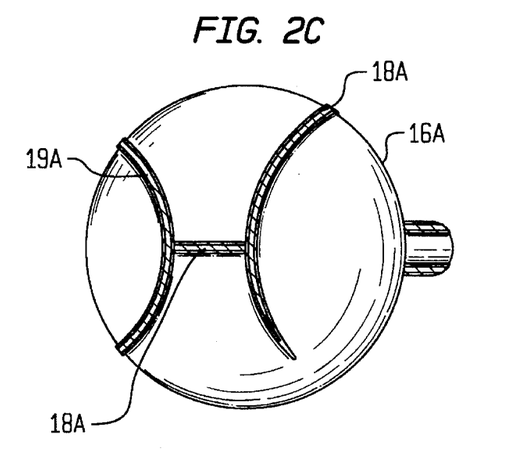
FIG. 2(c) is a rear view of the bladder casing shown in FIG. 2(a)
Figure 6:
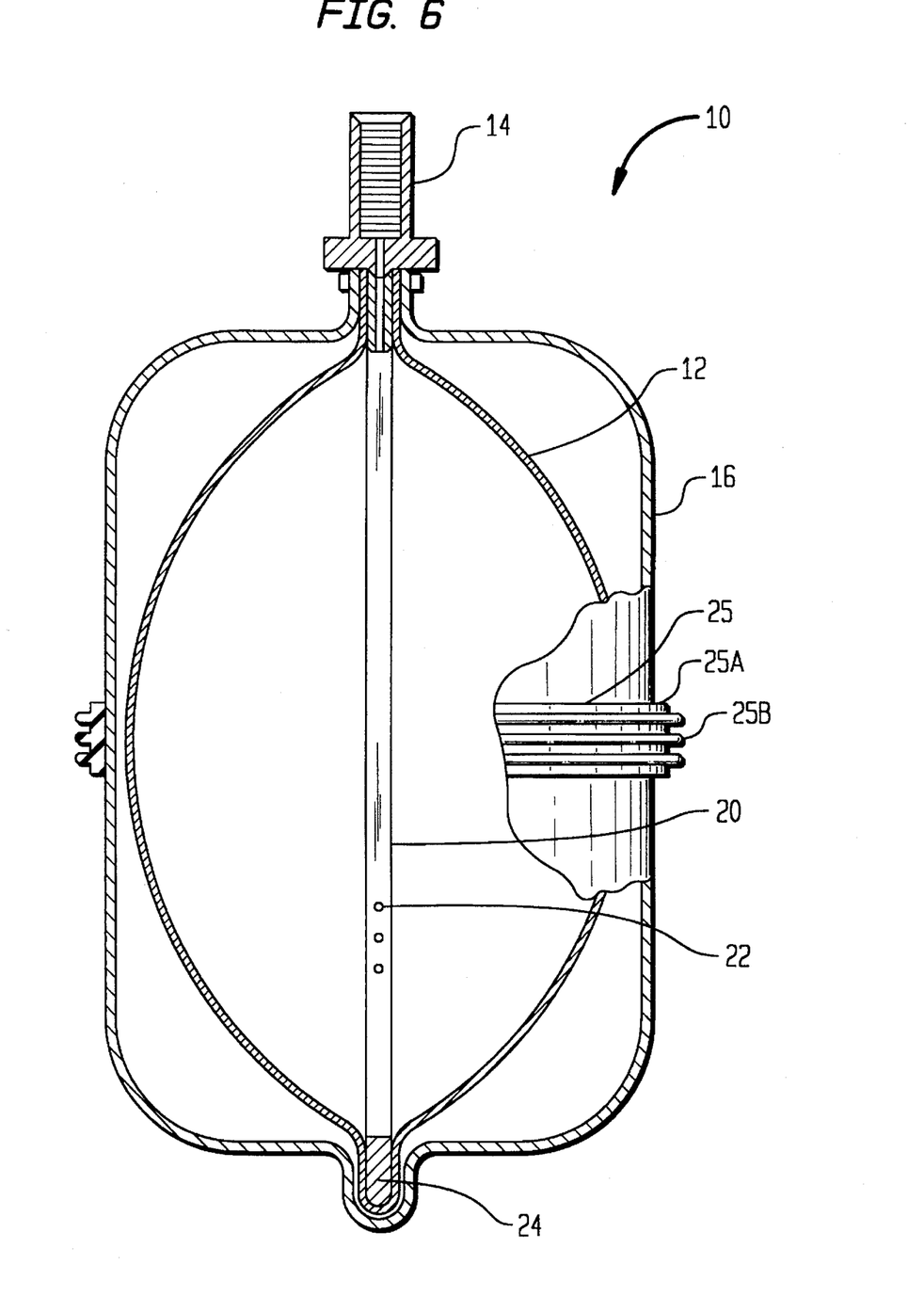
FIG. 6 is a sectional view of another embodiment of a pipeline flow stopper according to the present invention.

Referring to FIGS. 1(a), 1(b), and 6, one embodiment of the inventive pipeline flow stopper 10 will be described. The pipeline flow stopper 10 comprises an inner inflatable bladder 12 encased within an outer bladder casing 16. The inflatable bladder 12 is formed of flexible, gas-impervious material in a manner known in the art. During use, the pipeline flow stopper 10 is disposed in a collapsed, deflated state in a pipeline so that it can be inflated to seal an upstream section thereof from a downstream section. The pipeline flow stopper 10 is inserted through a small tap hole or the like formed in the pipeline, either by manually pushing it into the tap hole or by using a mechanical device to facilitate the insertion of the stopper 10 through the tap hole.

The inner inflatable bladder 12 is inserted in the pipeline in a collapsed, deflated form. To effect inflation, a pressurized gas, such as air, is supplied to the bladder 12 through a fitting 14 and a stiffening tube 20 extending lengthwise of the bladder 12. The tube 20 has a series of openings 22 for admitting the pressurized gas into the interior of the bladder 12. The distal end of the conduit 20 is provided with a rounded retaining fitting 24 which projects into aligned concavities at the ends of the inner bladder 12 and outer bladder casing 16 to maintain the bladder centered within the casing. The pressurized gas admitted through the openings 22 inflates the bladder 12 to an inflated form within the pipeline.

The expansion of the inner bladder 12 within the outer bladder casing 16 causes the casing 16 to be pressed tightly against the inner wall of the pipeline, thereby creating an airtight seal which prevents fluid in the pipeline from escaping past the stopper 10. To ensure that the stopper 10 has a leak-proof construction and is able to form an airtight seal, the bladder casing 16 is comprised of a fabric coated with a suitable substance, preferably a flexible polymer, to make the fabric impervious to fluids. The fabric may be canvas, nylon, dynel or other suitable materials. The flexible polymer may be a vinyl, polyurethane, natural rubber, neoprene, butyl or the like. In this embodiment, as shown in FIGS. 1(a) and 1(b), the bladder casing 16 is constructed of fabric coated with a suitable substance to render it impervious to fluids, and the fabric is cut into the desired size and shape to form the bladder casing. The cut fabric is folded and/or overlapped along seams 18, and the seams are sewn together with stitching along stitch lines 17 to form the casing 16. The stitched seams 18 are sealed to prevent fluid, such as a gas, from escaping past the stopper 10 through the seams 18. For this purpose, sealing means 19, such as a liquid seam sealer, is applied over the stitch lines 17 and over the seams 18 to form an airtight layer or skin over the sewn portions of the fabric to seal the stitch threads and any holes or gaps. Suitable seam sealers are those composed of urethane, neoprene, vinyl, butyl, silicone or other polymers. Alternatively, the sewing may be eliminated entirely and the seams 18 may be sealed by cementing, vulcanization or other means or by electronically heat sealing all the seams so that no gas is able to penetrate through the seams 18 and flow past the stopper 10.

To assist in airtightly sealing the pipeline flow stopper 10 in a pipeline, a flexible sealing member 25 is preferably provided around the exterior of the bladder casing 16 for making flexible sealing engagement with the inner wall of the pipeline. The sealing member 25 is preferably formed of a soft, flexible material and may comprise, for example, an O-ring made of rubber or plastic. In this embodiment, the sealing member 25 extends circumferentially around the outside of the bladder casing 16 and comprises a flexible support band 25a encircling the bladder casing and three flexible ribs 25b projecting radially outwardly from the band 25a and extending circumferentially therearound. By such a construction, when the inner inflatable bladder 12 is inflated to expand the outer bladder casing 16 into engagement with the pipeline inner wall, the flexible sealing ribs 25b undergo resilient deformation as they are pressed outwardly against the pipe wall, thereby assisting in effecting an airtight seal between the inside of the pipe and the outside of the stopper 10. While three flexible ribs 25b are illustrated in the drawings, a lesser or greater number of such ribs may be provided. Also, the ribs may have any suitable cross-sectional shape and need not be shaped as shown in the drawings.

In accordance with this embodiment of the present invention, the bladder casing 16 is constructed so as to provide a leak-proof seal between upstream and downstream sections of a pipeline. By constructing the bladder casing 16 from a fabric coated with a flexible polymer which does not allow gas to penetrate, and by sealing the stitch lines 17 and seams 18 of the bladder casing 16 or by eliminating the sewing entirely and otherwise sealing all the seams so that gas cannot penetrate through the seams 18, and by placing a soft, flexible sealing member 25, such as an O-ring made of rubber or plastic, circumferentially around the outside of the bladder casing, the pipeline flow stopper 10 overcomes the drawbacks of the conventional art by effectively preventing any gas from escaping past the stopper 10.

Referring to FIGS. 2(a), 2(b), 2(c) and 5, another embodiment of the present invention will be described. As with the first embodiment, this embodiment provides a pipeline flow stopper 10a which can prevent fluid, such as gas, in one section of pipeline from escaping past the stopper 10a and entering another section. For ease of description, parts in the second embodiment which are similar or correspond to parts in the first embodiment are similarly numbered with the added suffix "a".

The pipeline flow stopper 10a includes an inner inflatable bladder 12a encased within an outer bladder casing 16a. The stopper 10a may be inserted through a small tap hole or other opening cut in the pipe, either by manually pushing it into a tap hole or by using various mechanical devices that facilitate the insertion of the stopper 10a through the tap hole. The inner inflatable bladder 12a is inserted in the pipeline in a collapsed, deflated form and then inflated in situ by pressurized air supplied through a fitting 14a connected to a source of pressurized air. The bladder 12a is formed of flexible, gas-impervious material and the bladder casing 16a is formed of a fabric coated with a flexible polymer. The compositions of the fabric and polymer are the same as those described above with reference to the bladder casing 16 of the first embodiment.

This embodiment illustrates the other basic type of bladder casing construction. Instead of joining the parts of the bladder casing 16 by stitching and then sealing the stitch lines and seams as in the first embodiment, the parts of the bladder casing 16a are simultaneously joined and sealed in one process without using stitching. In this embodiment, the bladder casing 16a is formed of fabric which is folded and/or overlapped along seams to form the bladder casing. The fabric is coated with a flexible polymer as in the first embodiment to make the fabric impervious to fluids. The fabric seams are joined and sealed together by joining-and-sealing means 19a, which may comprise, for example, heat-sealed or vulcanized or cemented regions formed along the length of the seams 18a of the bladder casing 16a. For example, the fabric seams may be joined together by heat-sealing or vulcanization or cementing, which melts and/or fuses together the material of the fabric coating to thereby join and seal the seams of the unstitched bladder casing 16a. No sewing is required.

A sealing member 25a is preferably provided circumferentially around the outside of the bladder casing 16a to assist in airtightly sealing the pipeline flow stopper 10a in a pipeline. The sealing member 25a has a construction similar to that of the sealing member 25. Due to the spherical shape of the outer bladder casing 16a, the sealing member 25a may frequently be omitted without sacrificing the sealing action of the stopper.

Thus, in accordance with this embodiment the present invention, the bladder casing 16a is constructed from a coated fabric which is effective to prevent gas from escaping past the stopper 10a through the fabric. The seams 18a of the bladder casing 16a are joined and sealed by heat-sealing, cementing, vulcanization or other means so that gas in the pipeline cannot flow through the seams 18a and escape past the pipeline flow stopper 10a. In addition, a soft, flexible sealing member, such as an O-ring made of rubber or plastic, may be placed circumferentially around the outside of the bladder casing in order to assist in forming an airtight seal between the outside of the stopper and the inside of the pipeline. By such a construction, the pipeline flow stopper 10a overcomes the drawbacks of the conventional art and prevents the flow of any gas past the stopper, thereby improving the efficiency, safety and effectiveness of its use. Alternatively, the seams 18a may be sewn together with stitching and the stitched seams sealed by a liquid seam sealer, as in the embodiment of FIGS. 1 and 6, instead of sealing the unstitched seams by cementing, vulcanization or electronic heat sealing.

Figure 7:
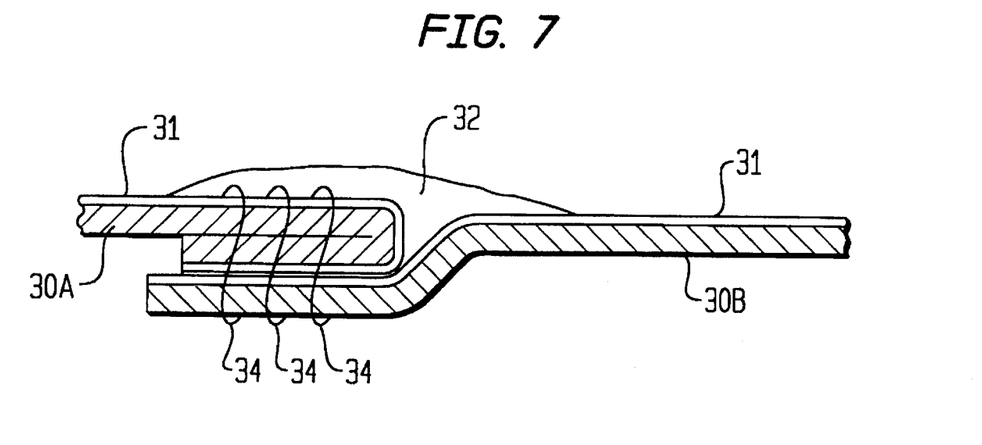
FIG. 7 is an enlarged, explanatory sectional view of a sealed stitched seam of an outer bladder casing according to the present invention.

FIG. 7 illustrates in more detail the manner of sealing stitched seams according to the present invention. Two sections of fabric 30a and 30b of the outer bladder casing are overlapped and sewn together by stitching 34. The outer surfaces of the fabric sections 30a and 30b which constitute the outside of the casing are coated with a flexible polymer layer 31 to render the fabric impervious to fluids. A liquid seam sealer 32 is applied over the stitching and along the seam where the two fabric sections 30a and 30b overlap one another. After curing, the seam sealer 32 forms an airtight layer over the sewn portions of the fabric to effectively seal the stitch line and seam. Though not normally required, it may be desired under some circumstances to apply liquid seam sealer over the stitching and along the seam on the inner side of the fabric as well as on the outer side thereof.

Figure 8:
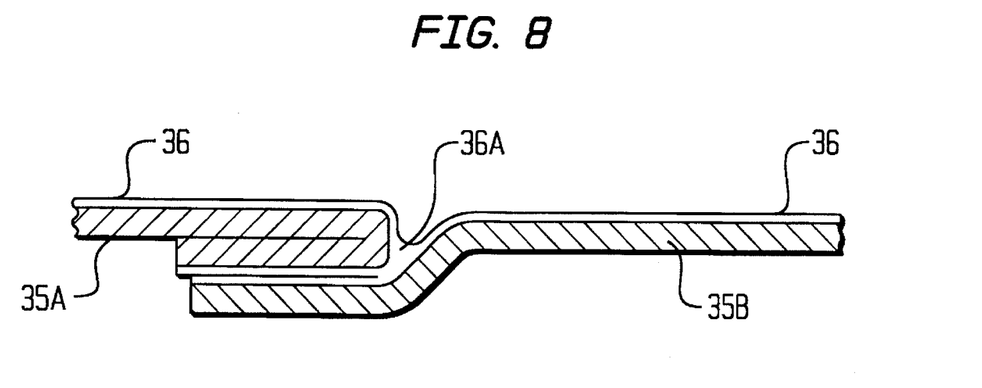
FIG. 8 is an enlarged, explanatory sectional view of a sealed unstitched seam of an outer bladder casing according to the present invention.

FIG. 8 illustrates the manner of sealing unstitched seams according to the present invention. Two sections of fabric 35a and 35b of the outer bladder casing are coated on their outer surfaces with a flexible polymer layer 36. The fabric sections 35a and 35b are folded and/or overlapped to form a seam. The seam is then electronically heat sealed by means of a heated tool or the like, which momentarily melts the polymer layers in the region of the seam so that the polymer layers fuse together to form a fused joint 36a which effectively seals the seam. Instead of heat sealing the seam, the seam may be vulcanized or cemented together.

Figure 9:
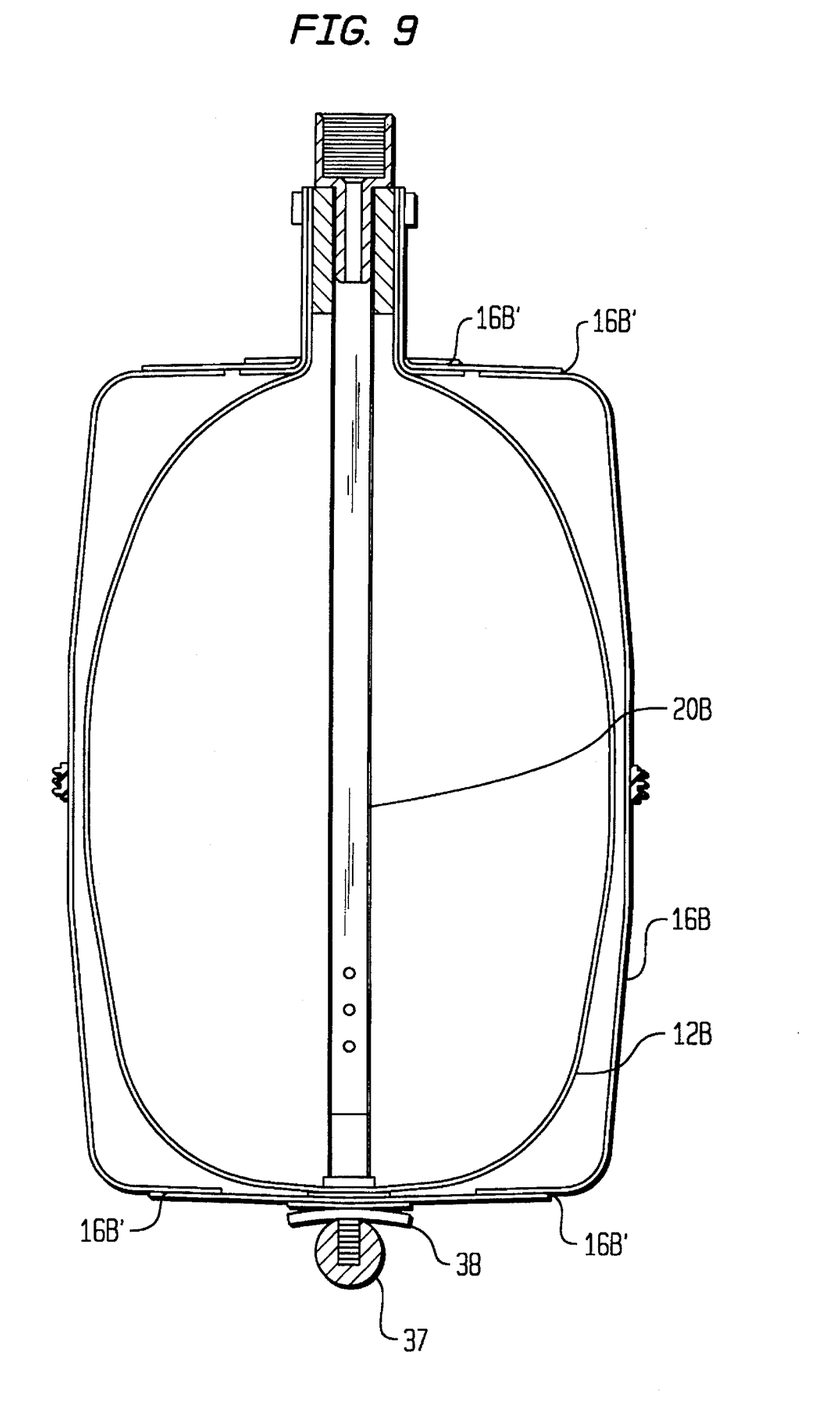
FIG. 9 is a sectional view of another embodiment of a pipeline flow stopper according to the present invention.

By way of example, FIG. 9 shows a sectional view of a pipeline flow stopper having an outer bladder casing 16b made entirely of electronically heat-sealed seams 16b'. In this embodiment, unlike the embodiment of FIG. 6, the distal end of the stiffening tube 20b projects through the outer casing 16b and is threaded to receive a threaded fitting 37. A washer 38 is interposed between the outer casing 16b and the fitting 37 to prevent damage to the outer casing when the fitting 37 is threaded and tightened on the stiffening tube 20b. In the FIG. 6 construction, there is the possibility that the rounded end of the fitting 24 which presses against the inner bladder 12 may, after repeated use, damage or possibly puncture the inner bladder 12. This drawback is obviated by the FIG. 9 construction which reduces stress concentration in the region where the stiffening tube engages the inner bladder.

With respect to the above description, it is realized that the optimum relationships for parts of the invention, including variations in size, materials, shape, form, function, and manner of operation, assembly and use, are deemed readily apparent and obvious to persons ordinarily skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operations shown and described. Accordingly, all suitable modifications and equivalents may be resorted to which fall within the scope and spirit of the appended claims.

I claim:

1. A outer casing apparatus for an inflatable air bag for stopping fluid flow through a pipeline, the outer casing comprising:

an interior for receiving an inner inflatable air bag therein;

an upper end having an aperture for an inner inflatable air bag to extend therethrough;

a continuous lower end;

a circumference extending about the outer casing between the upper and lower ends of the outer casing;

a flexible plastic applied over the outer casing;

a cylindrical sealing band extending about the circumference of the outer casing;

the cylindrical sealing band applied over the flexible polymer;

the cylindrical sealing band having upper and lower edges;

the upper edge of the cylindrical sealing band located below the upper end of the outer casing;

the lower edge of the cylindrical sealing band located above the lower end of the outer casing;

the cylindrical sealing band sealingly engaging with an inner surface of a pipeline to seal the pipeline and stop fluid flow therethrough.

2. The apparatus of claim 1 wherein seams form the outer casing into a closed, three-dimensional shape and said seams are sealed to prevent fluid flow therethrough.

3. The apparatus of claim 2 wherein the cylindrical sealing band is located about a longitudinal midpoint between the upper and lower ends of the outer casing.

4. The apparatus of claim 3 wherein the cylindrical sealing band includes at least one flexible rib projecting outwardly therefrom about the circumference of the outer casing.

5. The apparatus of claim 3 wherein the cylindrical sealing band supports three flexible ribs projecting radially outward from the band and extending about the circumference of the outer casing.

6. An inflatable air bag apparatus for stopping fluid flow through a pipeline comprising:

an inflatable inner air bladder for receiving and holding air;

an outer casing disposed about the inflatable inner air bladder;

the outer casing including an upper end having an aperture for the inner air bladder to extend therethrough, and a continuous lower end;

a circumference extending about the outer casing between the upper and lower ends of the outer casing;

a flexible plastic disposed about the outer casing; and a cylindrical sealing band extending circumferentially about an outer sealing means disposed about the outer casing of the air bag;

the cylindrical sealing band having upper and lower edges;

the upper edge of the cylindrical sealing band located below the upper end of the outer casing;

the lower edge of the cylindrical sealing band located above the lower end of the outer casing;

wherein, inflating the inner air bladder forces the cylindrical sealing band to engage an inner surface of a pipeline for stopping fluid flow therethrough.

7. The apparatus of claim 6 wherein seams form the outer casing into the closed, three-dimensional shape and said seams are sealed to prevent fluid flow therethrough.

8. The apparatus of claim 7 wherein the cylindrical seal band is located about a longitudinal midpoint between the upper and lower ends of the outer casing.

9. The apparatus of claim 8 wherein the cylindrical sealing band includes at least one flexible rib projecting outwardly from the cylindrical sealing band about the circumference of the outer casing.

10. The apparatus of claim 9 wherein the cylindrical sealing band supports three flexible ribs projecting radially outward from the cylindrical sealing band and extending about the circumference of the outer casing.

11. A collapsible, inflatable pipeline flow stopper insertable in a pipeline to temporarily block flow of fluid through the pipeline, the stopper comprising: an inner inflatable bladder having a collapsed, deflated form for insertion into a pipeline and receptive of a pressurized gas to inflate to an inflated form within the pipeline; and an outer bladder casing encasing the outer inflatable bladder and sealingly engageable with the inner wall surface of the pipeline in response to inflation of the inflatable bladder to block to fluid flow through the pipeline, the outer bladder casing being comprised of fabric impervious to fluid flowing in the pipeline, means for joining the fabric along seams to define a flexible fabric casing, and means for fluidtightly sealing the seams to prevent fluid flow therethrough; and flexible sealing means disposed circumferentially along the outside of the outer bladder casing for sealingly engaging the inner wall surface of the pipeline when the inner inflatable bladder is inflated to assist in effecting a fluidtight seal between the stopper and pipeline.

12. A collapsible inflatable pipeline flow stopper according to claim 11, wherein the flexible sealing means comprises of flexible O-ring having a flexible support band encircling the outer bladder casing, and at least one flexible rib projecting outwardly from the support band and extending circumferentially therearound.

\* \* \* \* \*